United States Patent Office 3,368,283
Patented Feb. 13, 1968

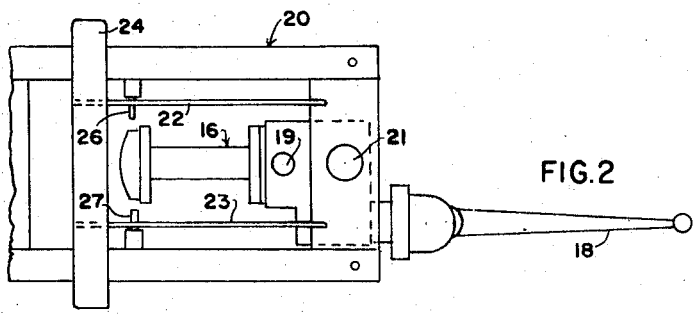
FIG.2
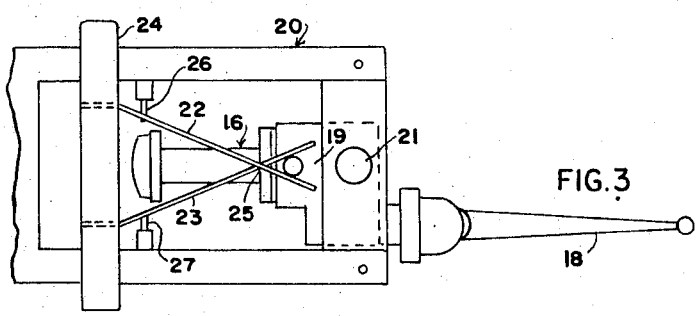
FIG.3
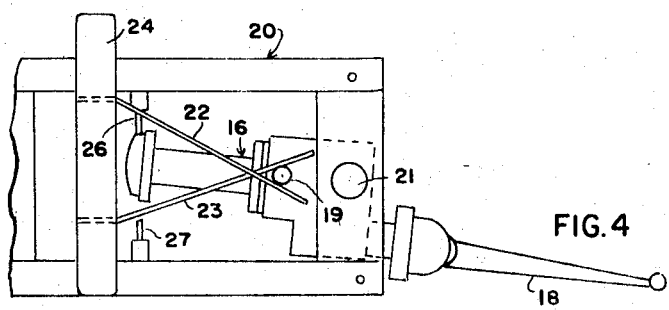
FIG.4
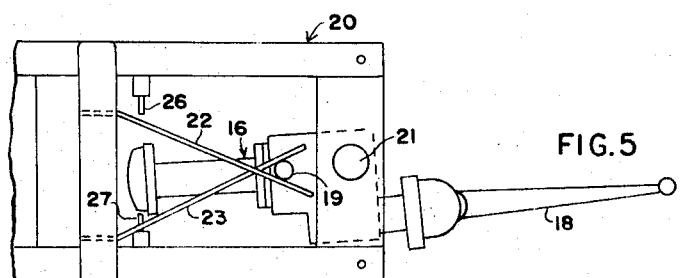
FIG.5
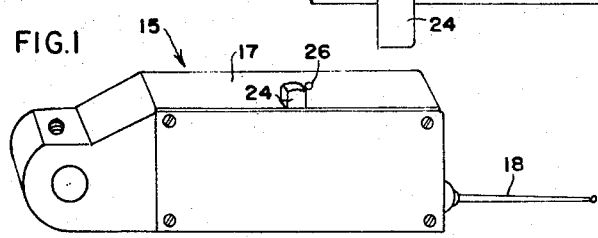
FIG.1
INVENTOR,
Edward LeVasseur,
BY
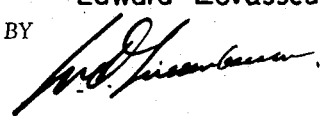
ATTORNEY.

3,368,283
INDICATOR FEELER BIASING AND
REVERSIBLE MEANS
Edward LeVasseur, Cumberland, R.I., assignor to
Boice Gages, Inc., Hyde Park, N.Y., a corporation
of New York
Filed Oct. 15, 1965, Ser. No. 496,562
8 Claims. (Cl. 33—169)

ABSTRACT OF THE DISCLOSURE

This precision measuring instrument has a lever swingably mounted for movement between two stops on a frame. The lever presents a feeler element whose movement when applied to a piece of work, is to be noted or determined. Two springs, on a slide having two limit positions, bias the lever towards said stops respectively. When the slide is set at one of its limit positions, the feeler becomes adapted for movement upwardly, and when the slide is set at its other limit position, the feeler is for movement downwardly. At each such slide position, said springs are unequally stressed. The resulting force acting on the lever is smaller than heretofore, thus the instrument has a greater sensitivity besides being reversible.

---

The present invention relates to indicators which have a swingably mounted, spring-biased lever presenting a finger or feeler as it is commonly called, to be applied to a piece of work for precision measurement. In these devices, feeler movement is translated either electrically or mechanically into some form of visible information.

An object of this invention is to provide novel and improved construction in indicators of the class mentioned, affording greater sensitiveness in feeler performance than was heretofore possible.

A further object thereof is to provide novel and improved construction in indicators of this type, in which the spring means is easily set so the feeler tip can be selectively used for either upward or downward movement.

Still another object of this invention is to provide a novel and improved construction in indicators of the character described, which is simple in structure, reasonable in cost to manufacture and efficient in carrying out the purposes for which it is designed.

Other objects and advantages will become apparent as this disclosure proceeds.

For one practice of this invention, two blade springs acting on said pivoted lever, are biased to urge it to swing in opposite directions respectively. These blade springs are on a slide. When the slide is in one position, the feeler is set for movement downwardly, and when in another position, said feeler is set for movement upwardly. Both blade springs act constantly on said lever, so the resultant force acting on the lever is smaller than heretofore possible and hence the instrument has greater sensitivity and variable sensitivity, besides being reversible.

In the accompanying drawing forming part of this specification, similar characters of reference indicate corresponding parts in all the views.

FIG. 1 is a perspective view of an indicator embodying the teachings of this invention.

FIG. 2 is a fragmentary enlarged view of the mechanism which is within the casing, only to such extent as is necessary to explain this invention. Shown essentially is the feeler-carrying lever pivoted on framework, the slide-borne cantilever springs acting on said lever, and stop elements determining the extent of movement allowed said lever. In this view, only the assembly of the parts is shown, but the springs need yet to be placed in operative position.

FIG. 3 is like FIG. 2, but here the springs are set in operative position, and the slide is at its midposition of travel at which time there is no force acting to move said lever.

FIG. 4 is a similar view, showing the slide in position whereby the feeler is to be used for upward movement.

FIG. 5 is a similar view, showing the slide set in another position whereby the feeler is to be used for downward movement.

In the drawing, the indicator designated generally by the numeral 15, includes the lever 16 which from within a casing 17, presents an exterior feeler 18, and said lever within said casing, has a pin 19 extending laterally therefrom; said lever being pivotally mounted between said pin and feeler, to framework 20 within the casing, on an axis 21 which is parallel to said pin 19. To substantially identical blade springs which are the wire pieces 22 and 23, extend as cantilevers within said casing, from a slide 24 mounted for up and down movement on the framework; the general plane of said blade springs being perpendicular to said pin 19. Such pin is between said blade springs and is constantly contacted by them, for in assembly they are crossed as in FIG. 3, which brings them into equal stressed condition when the slide 24 is at its mid-point of travel, biased to uncross as distinguished from their unstressed condition as shown in FIG. 2 before they were crossed; said pin 19 being intermediate the crossing point 25 of said blade springs and the axis 21, meaning within the V-form made by the distal end portions of said blade springs. It is evident that the stressed blade spring 22 urges the lever 16 to swing clockwise and that the stressed blade spring 23 urges said lever to swing counter-clockwise. Movement of the slide 24, to its upward position as shown in FIG. 4, will increase the stress in the blade spring 22 and lessen the stress in the blade spring 23, hence the arrangement is made for upward feeler movement. Movement of said slide to its downward position as shown in FIG. 5, will increase the stress in the blade spring 23 and lessen the stress in the blade spring 22, hence the arrangement is made for downward feeler movement. It is evident that the resultant force acting to bias the lever 16 is the difference in the efforts exerted by the blade springs 22, 23 on the pin 19. The limits of movement permitted to the lever 16, are determined by the stops 26 and 27 respectively. Feeler movement is of course imparted to the lever, which in turn is translated by electrical or mechanical means not shown but well known in this art, into some form of visible information on a scale or meter.

The sensitiveness of the indicator device 15 is increased as the force acting to bias the lever 16 is decreased. But mechanical limitations dictate a minimum dimension of the spring material, so heretofore, the commonly used gaging pressure as it is termed in the art, was hardly less than seven grams.

In the present invention, using conventional spring stock for the blade springs 22, 23, the gaging pressure is brought down considerably because by the spring structure and function as herein taught, it is the difference of the spring efforts that determines the gaging pressure, and such difference is always less than the effort of one spring.

When the slide 24 is at its mid-point of travel as shown in FIG. 3, it is evident that the stress in each of the blade springs 22 and 23 is equal, and since it is desired that gaging pressure shall be equal when the slide is at either of its limit positions, as shown in FIGS. 4 and 5 respectively, proper stops, not shown, may be provided to establish the mid-point of travel condition of the slide 24, or as resorted to in the embodiment illustrated, at each terminal position of said slide, one end thereof shall be flush with the casing body.

In the embodiment illustrated, the provision of the spring-carrying slide makes the indicator one of the reversible type. It should be noted however that the advantage of utilizing the difference of spring efforts to attain greater sensitivity, can be utilized in a one-direction gage, in which instance the cantilever springs would be fixed to the frame and the slide omitted.

This invention is capable of numerous forms and various applications without departing from the essential features herein disclosed. It is therefore intended and desired that the embodiment set forth herein shall be deemed merely illustrative and not restrictive and that the patent shall cover all patentable novelty herein set forth; reference being had to the following claims rather than to the specific showing and description herein to indicate the scope of this invention.

I claim:

1. In an indicator device of the character described, the combination of a frame, a lever swingably mounted for movement about an axis on the frame, a feeler element extending from one end of said lever, spaced stop means on the frame in the path of said lever to limit the extent of movement of said lever about said axis; said lever being adapted to contact with one of said stops, two springs carried on the frame, one biasing the lever towards said one stop and the other biasing said lever towards the other stop, and means for stressing one spring to a greater extent than said other spring.

2. The combination as defined in claim 1, wherein said means comprises a member movably mounted on the frame for movement from a first position to a second position and associated with both springs whereby in its movement it will cause them to move so that when said member moves in one direction, the stress in one of said springs will be increased and in the other decreased, and when said member moves in the other direction, the stress in said one spring will be decreased and in the other increased; said springs being substantially identical; said springs being equally stressed when said member is at its mid-position on the frame.

3. In an indicator device of the character described, the combination of a frame, a lever swingably mounted for movement about an axis on the frame, a feeler element extending from one end of said lever, spaced stop means on the frame in the path of said lever to limit the extent of movement of said lever about said axis; said lever being adapted to contact one of said stops, a pin spaced from said axis, extending laterally from said lever parallel to said axis, a slide slidably mounted on the frame from a first position to a second position, two cantilever blade springs extending from said slide towards said pin; said blade springs being in spaced relation, in stressed condition and bearing against said pin to turn said lever in opposite directions respectively; the point of intersection of said springs being intermediate said slide and pin; said springs being equally stressed when said slide is at its mid-position and said springs being substantially identical.

4. The combination as defined in claim 3, wherein said axis is intermediate the pin and feeler.

5. The combination as defined in claim 3, wherein said axis and the axis of said pin when said slide is at its mid-position determine a plane which is perpendicular to the line of movement of said slide.

6. The combination as defined in claim 5, wherein the other end of said lever is intermediate said slide and feeler, said axis is intermediate said pin and feeler and the general plane of said springs is perpendicular to said pin.

7. The combination as defined in claim 3, wherein the other end of said lever is intermediate said slide and feeler.

8. The combination as defined in claim 7, wherein the general plane of said cantilever springs is perpendicular to said pin.

References Cited
UNITED STATES PATENTS

| | | | |
|---|---|---|---|
| 1,167,592 | 1/1916 | Neumann | 33—172 |
| 1,459,500 | 6/1923 | Cady | 33—148 |
| 2,189,631 | 2/1940 | Farmer | 33—172 |
| 2,242,151 | 6/1941 | Sisson | 33—172 |
| 2,308,207 | 1/1943 | Reinhard | 33—172 |

WILLIAM D. MARTIN, JR., *Primary Examiner.*